United States Patent [19]

Adolfsson

[11] Patent Number: 4,923,361
[45] Date of Patent: May 8, 1990

[54] DEVICE FOR MOVING AT LEAST A PART OF A VEHICLE IN A SIDEWARD DIRECTION

[75] Inventor: Rune Adolfsson, Skyttegatan 4, Sweden

[73] Assignee: SKF Nova AB, Sweden

[21] Appl. No.: 344,819

[22] Filed: Apr. 27, 1989

[30] Foreign Application Priority Data

May 2, 1988 [SE] Sweden .................................. 8801645

[51] Int. Cl.⁵ .............................................. B66F 9/06
[52] U.S. Cl. ..................................... 414/541; 414/592; 180/8.6; 187/9 R; 280/43.12
[58] Field of Search ............... 414/458, 490, 539, 540, 414/541, 592, 662, 663, 664, 667, 668, 671; 180/8.6, 199; 280/43.12; 187/9 R

[56] References Cited

U.S. PATENT DOCUMENTS

| | | | |
|---|---|---|---|
| 1,967,219 | 7/1934 | Barr | 180/199 X |
| 2,918,738 | 12/1959 | Barr | 180/8.6 X |
| 2,986,225 | 5/1961 | Travaglio | 280/43.12 |
| 3,817,546 | 6/1974 | Sugiura | 280/43.12 |
| 3,834,667 | 9/1974 | Sanger | 414/458 X |
| 3,850,259 | 3/1973 | Ikeda et al. | 180/8.6 |
| 4,221,526 | 9/1980 | Crandall | 280/43.12 X |
| 4,527,650 | 7/1985 | Bartholet | 180/8.6 |
| 4,680,022 | 7/1987 | Hoshino et al. | 180/8.6 X |

FOREIGN PATENT DOCUMENTS

| | | | |
|---|---|---|---|
| 61-1562 | 1/1986 | Japan | 180/199 |
| 61-113573 | 5/1986 | Japan | 180/8.6 |
| 62-160946 | 7/1987 | Japan | 180/199 |
| 165385 | 9/1964 | U.S.S.R. | 180/8.6 |

Primary Examiner—Robert J. Spar
Assistant Examiner—Robert S. Katz
Attorney, Agent, or Firm—Eugene E. Renz, Jr.

[57] ABSTRACT

A device for providing sideward displacement of a vehicle having vertically adjustable members such as a forklift truck, comprising at least one displacement member attached to said vertically adjustable member, said displacement member being pivotably movable from an active position to an inactive position, said device including a pedal to move the displacement member from said inactive position to said active position upon raising said adjustment member to a raised position, whereby lowering of said adjustable member causes contact of said displacement member with the ground, and whereby continued lowering of the adjustable member permits pivoting of the displacement member towards its inactive position to simultaneously displace at least a portion of the vehicle in a sideward direction.

4 Claims, 2 Drawing Sheets

DEVICE FOR MOVING AT LEAST A PART OF A VEHICLE IN A SIDEWARD DIRECTION

FIELD OF THE INVENTION

The present invention relates to device for use in vehicles such as forklift trucks and pallet carts for displacing the vehicle or one end thereof in a sideward direction.

BACKGROUND OF THE INVENTION

Many wheeled vehicles such as forklift trucks and pallet carts are changing the orientation of one set of wheels, such as, for example, the rear wheels, while front wheels or those wheels which are associated with the lifting mechanism are designed to rotate in a fixed plane. It is difficult to steer a vehicle of this type in confined spaces, such as where squeezing the vehicle in between other vehicles is required or when trying to maneuver pallet carts in narrow spaces. Typically, in commonly occurring designs, the vehicle is maneuvered back and forth by changing the steering wheels. This is a difficult maneuver, and requires a significant amount of time to reach the correct position so that, for example, the forklifts can engage or disengage a pallet.

It has been proposed to equip such vehicles with a particular driving design or means which displaces a vehicle in a sideways or lateral direction. Complicated apparatus including the use of a plurality of wheels and axles have been proposed. However, these designs have been utilized only to a very limited extent because of the complexity and cost.

It would be a great advantage to provide a simple and inexpensive means for moving wheeled vehicles in a lateral direction. It is accordingly an object of the present invention to provide such a drive for lateral displacement, which can be used in a plurality of applications.

SUMMARY OF THE INVENTION

It has now been discovered that the above and other and objects of the present invention may be accomplished by the following device.

Specifically, it is been discovered that vehicles such as forklift trucks and pallet carts can be moved in a sideways direction by the device of the present invention.

The device is intended to operate with vehicles having a vertically adjustable member, such as a forklift truck. At least one displacement member is attached to the vertical adjustment member. The displacement member is pivotably movable from an active position to an inactive position. The device includes a means for moving the displaced member to said active position upon raising the vertically adjustable member. Upon lowering the vertically adjustable member, the displacement member in its active position contacts the ground or whatever surface the vehicle is on. At this point, the displacement member is supporting that end of the vehicle. Movement of the vehicle in a lateral or sideward displacement is accomplished by movement of the displacement member in the direction toward its inactive position. This step can be repeated several times and can include sideward displacement members at both ends of the vehicle for simultaneous or sequential movement of the vehicle to accomplish sideward displacement of the vehicle.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
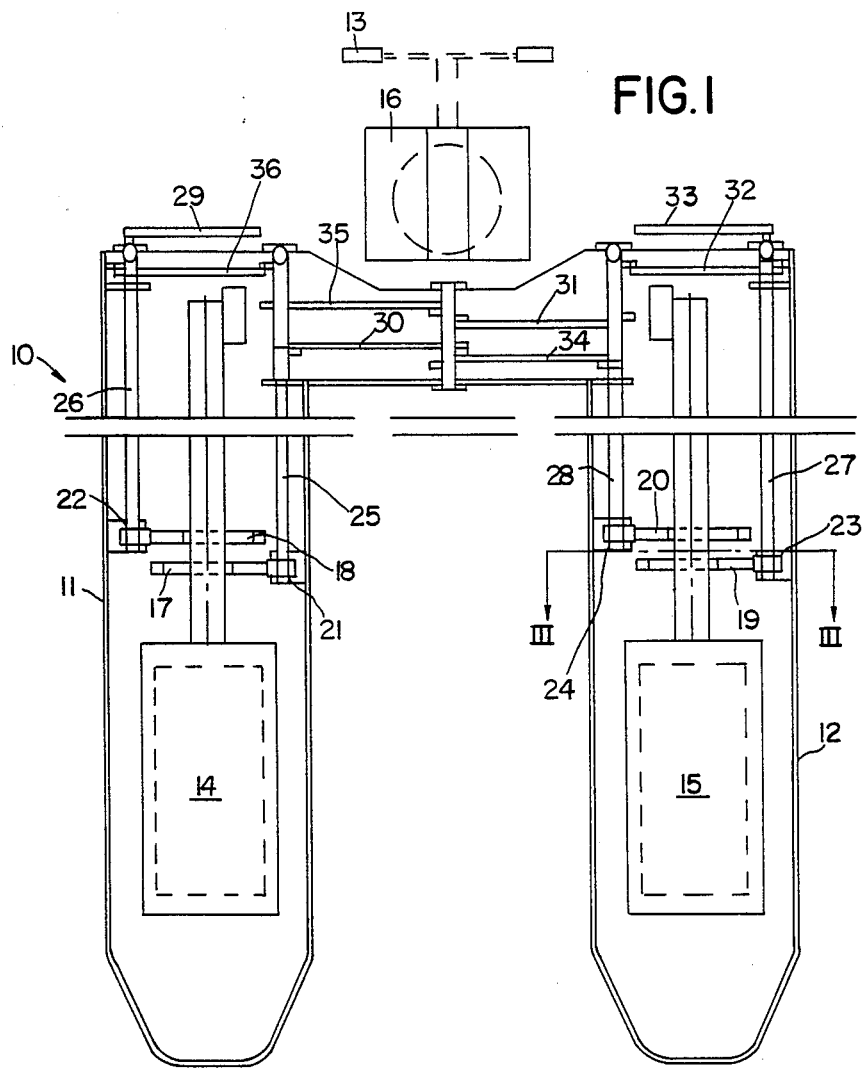
FIG. 1 shows a bottom view, or a view from below, of one embodiment of the present invention.
Figure 2:
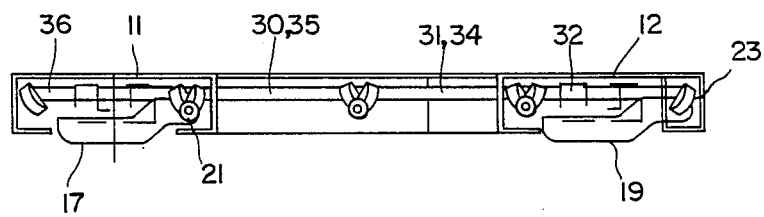
FIG. 2 shows a partial schematic end view of the device shown in FIG. 1 showing only one set of a pair of displacement means.

As shown in FIG. 1, the device shown generally by the reference 10 may be described as a pallet cart or a forklift truck or any of the vehicles which are intended to transport pallets. In the preferred embodiment shown in FIG. 1, the vehicle 10 includes at least one vertically movable load handling member, in the present instance, two lifting forks 11 and 12 which can be raised or lowered by conventional means and are controlled by a handle 13 which may operate hydraulic or mechanical lifting mechanisms for each or both lift forks 11 and 12. Alternatively, the device can be motorized and of the type known as forklift trucks.

At the front end of forks 11 and 12 are wheels 14 and 15 to provide forward movement of the vehicle 10. These wheels typically are provided with an axle which operates in a fixed plane and does not allow for change of direction. The device is also provided with a pair of wheels 16 located between the lifting forks and at the rear end of the device. Handle 13 is employed to steer the device by changing the axis of wheel pair 16.

At the front end of the lifting forks 11 and 12, four supporting legs 17, 18, 19 and 20 are located. These legs 17-20 function as displacement members as will be described hereinafter. Each of the four legs or displacement members 17-20 are supported on pivot axles 21, 22, 23 and 24. These displacement members 17-20 pivot about axles 21-24 and are controlled by individual longitudinal rods 25, 26, 27 and 28 in such a way that turning of a rod 25-28 results in pivoting of the corresponding supporting leg 17-20 about the axle 21-24.

Figure 4:
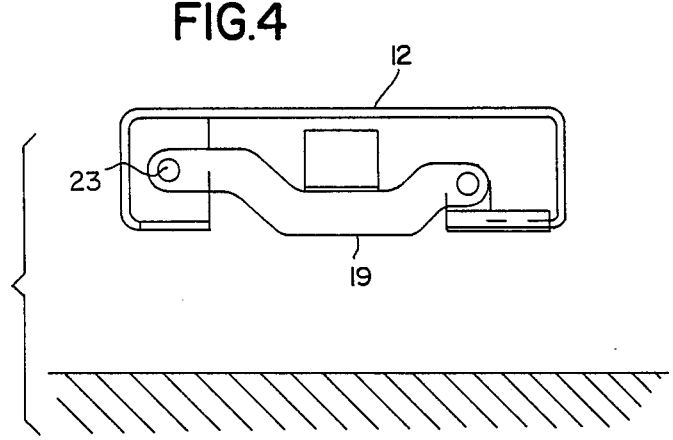
FIG. 4 shows a view of the device shown in FIG. 1 along line III,III with the lateral displacement member in the inactive position.

Typically, during transport of a pallet on the pallet cart 10, the lifting forks 11 and 12 are elevated, so as to carry the pallet. The supporting legs 17-20 are maintained in their inactive position, as shown in FIG. 4. Particularly shown in FIG. 4 is one leg 19 which has been pivoted about axle 23 and is contained in an inactive position under the fork 12. Each of the other three legs 17, 18 and 20 are stored in a similar manner.

Once the steering of the cart 10 has reached a desired position, the front end with the wheels 14 and 15 often times will not reach the position which is desired. At this time, supporting legs 17 and 19 or supporting legs 18 and 20 are lowered to their actuating position as shown in FIG. 3.

Figure 3:
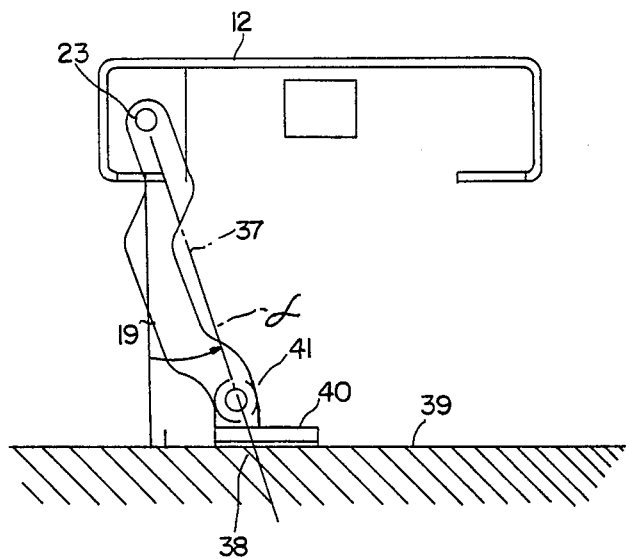
FIG. 3 shows a view of the device shown in FIG. 1 along line III,III with the lateral displacement member in the active position.

The lowering of the supporting legs 17 or 19 to the operating or active position shown in FIG. 3 is accomplished by a foot operated pedal 33 which is, for example, connected to rod 27. Rotation of the rod 27 by the pedal 33 is accomplished by a slew bracket 30, 31 and 32 to thereby transfer a rotation of the rod 25, for example. Likewise, a pedal 29 is connected to rod 26, so that turning of the rod 26 is accomplished by actuation of pedal 29 to transfer a corresponding rotation of rod 28 due to the operation of slewing brackets 34, 35 and 36.

In operation, the cart 10 is placed in a position by using the handle 13 to direct the pair of wheels 16. Since wheels 14 and 15 do not allow for maneuverability, the supporting leg system is employed in part a sideward movement to the vehicle. The lift fork 12, for example, is raised and a set of legs, such as 17 and 19 or 18 and 20 are lowered as shown in FIG. 3, depending upon which direction a position correction is desired. The foot pedal 33 which is connected to rod 27 affects a pivoting of supporting legs 17 and 19. The rotation of the rod 27, actuating by the pedal 33 through slewing brackets 30, 31 and 32, is transferred into a corresponding rotation of rod 25. In a similar manner, a pedal 29 is connected to rod 26, so that a turning of the rod 26 caused by an actuation of pedal 29 will transfer a corresponding rotation of rod 28 through slewing brackets 34, 35 and 36.

When the supporting leg is in its active position, that is in contact with the ground or the base, as is seen in FIG. 3, a connecting line 37 extends between the contact point 38 on the ground 39 and a pivot axis 23. This line 37 forms an acute angle $\alpha$ with the perpendicular to the base 39. As shown in FIG. 3, a supporting foot 40 is pivotable supported above an axle 41 on the leg 19. Thus, the connecting line is defined as a straight line through the axles 23 and 41. An acute angle with the perpendicular, is obtained for all lines through axle 23 and a point on the supporting foot 40.

When the supporting legs, such as legs 17 and 19, have been extended to their active position, the ends of the supporting legs are situated a short distance above the floor or base 39. The lifting forks 11 and 12 are thereupon lowered. As the lifting forks 11, 12 continue to be lowered after the supporting legs 17 and 19 contact the floor or base 39, because of friction between the supporting legs and the base, a displacement of the front end of the pallet cart 10 will place in a lateral direction during simultaneous pivoting of the two support legs 17 and 19 in a direction toward its inactive position. During this lateral displacement of the cart 10, the wheels 14 and 15 will slide against the floor 39.

Because the back pair of wheels 16 are steerable using the handle 13, the rear end of the cart can normally be easily positioned in the correct location. Of course, it is possible to provide supporting legs of the type described at the rear end of the cart as well.

The present invention is useful in a variety of vehicles which contain vertical adjustment mechanisms such as forklift devices. For example, many carts are designed with vertically adjusted gas or hydraulic suspensions under one or both sets of wheels. The supporting legs would then be pivotably movably beyond the perpendicular to the base so as to provide for side displacement of the vehicle in both directions.

While particular embodiments of the present invention have been illustrated and described herein, it is not intended to limit the invention and changes and modifications may be made therein within the scope of the following claims.

What is claimed is:

1. A device for providing sideward displacement of a load handling vehicle having means for movably supporting the vehicle relative to a support surface and having a least one vertically movable load handling member comprising:

means for vertically moving said movable member;

at least one displacement member pivotally attached to the vertically movable member and being pivotally movable form a lower active position to an upper inactive position;

means to lower said displacement member from said inactive position to said active position upon raising said movable member to a raised position;

whereby lowering of said movable member causes contact of said displacement member with the support surface, and whereby the continued lowering of the movable member causes pivoting of said displacement member towards its inactive position to simultaneously displace at least a part of the vehicle in a sideward direction while the vehicle is supported on the movable support means.

2. The device according to claim 1 further characterized by when said displacement member is in its active position and contacting the support surface, the angle formed between the line which extends from the pivot axis and point of contact of the displacement member and the support surface and the line which extends vertically from the pivot axis to the support surface, is an acute angle.

3. The device according to claim 1, wherein said movable load handling member comprises a pair of lifting forks and each lifting fork is provided with a displacement member, said displacement members being interconnected by a connecting means, whereby actuation of one member for movement to its active position causes simultaneous actuation of the other displacement member to its active position.

4. The device of claim 1 wherein said load handling member comprises more than one displacement member thereby allowing movement in either sideways direction.

* * * * *